United States Patent
Balakrishnan et al.

(10) Patent No.: US 8,954,399 B1
(45) Date of Patent: Feb. 10, 2015

(54) DATA DE-DUPLICATION FOR INFORMATION STORAGE SYSTEMS

(75) Inventors: Narayanan Balakrishnan, Milpitas, CA (US); Ajit Narayanan, Fremont, CA (US); Anandh Mahalingam, Newark, CA (US); Paresh Chatterjee, Fremont, CA (US); Udita Chatterjee, legal representative, Kolkatta (IN)

(73) Assignee: American Megatrends, Inc., Norcross, GA (US)

( * ) Notice: Subject to any disclaimer, the term of this patent is extended or adjusted under 35 U.S.C. 154(b) by 319 days.

(21) Appl. No.: 13/450,407

(22) Filed: Apr. 18, 2012

Related U.S. Application Data

(60) Provisional application No. 61/476,447, filed on Apr. 18, 2011.

(51) Int. Cl.
*G06F 17/30* (2006.01)

(52) U.S. Cl.
USPC .......................................... 707/692

(58) Field of Classification Search
CPC ................................ G06F 17/30156
USPC ............................................ 707/692
See application file for complete search history.

(56) References Cited

U.S. PATENT DOCUMENTS

| | | | |
|---|---|---|---|
| 7,647,443 B1 * | 1/2010 | Chatterjee et al. | 710/200 |
| 8,332,612 B1 * | 12/2012 | Raizen et al. | 711/202 |
| 8,370,315 B1 * | 2/2013 | Efstathopoulos et al. | 707/696 |
| 8,495,304 B1 * | 7/2013 | Natanzon et al. | 711/133 |
| 8,539,148 B1 * | 9/2013 | Chen et al. | 711/112 |
| 8,633,838 B2 * | 1/2014 | Falls et al. | 341/87 |
| 8,655,844 B1 * | 2/2014 | Wong | 707/638 |
| 8,682,850 B2 * | 3/2014 | Colbeck et al. | 707/637 |
| 2007/0255682 A1 * | 11/2007 | Brelsford et al. | 707/2 |
| 2008/0005201 A1 * | 1/2008 | Ting et al. | 707/204 |
| 2008/0059442 A1 * | 3/2008 | Guo et al. | 707/4 |
| 2008/0183777 A1 * | 7/2008 | Xi et al. | 707/205 |
| 2010/0037118 A1 * | 2/2010 | Saliba et al. | 714/752 |
| 2010/0042790 A1 * | 2/2010 | Mondal et al. | 711/161 |
| 2010/0088349 A1 * | 4/2010 | Parab | 707/802 |
| 2010/0332454 A1 * | 12/2010 | Prahlad et al. | 707/654 |

(Continued)

OTHER PUBLICATIONS

Achieving Storage Efficiency with EMC Celerra, May 2009, pp. 1-20.*

(Continued)

*Primary Examiner* — Albert Phillips, III
(74) *Attorney, Agent, or Firm* — Meunier Carlin & Curfman, LLC

(57) ABSTRACT

Methods and systems for identifying candidates for de-duplication are disclosed herein. An example system may include: a de-duplication lister that coordinates with a kernel module to identify a unit of data for de-duplication and calculates a signature of the unit of data; a de-duplication queue that manages a de-duplication queue; a de-duplication tracker that maintains a de-duplication data structure including a plurality of entries corresponding to units of data and searches the de-duplication data structure to determine whether the signature of the identified unit of data matches the signature of at least one of the entries in the de-duplication data structure; a de-duplication maintainer that reviews the entries of the de-duplication data structure and removes obsolete entries from the de-duplication data structure; and a de-duplication engine that coordinates with the kernel module to perform de-duplication operations on the de-duplication queue.

15 Claims, 12 Drawing Sheets

(56) References Cited

U.S. PATENT DOCUMENTS

| | | | | |
|---|---|---|---|---|
| 2011/0066628 | A1* | 3/2011 | Jayaraman | 707/758 |
| 2011/0099154 | A1* | 4/2011 | Maydew et al. | 707/692 |
| 2011/0138144 | A1* | 6/2011 | Tamura et al. | 711/166 |
| 2011/0307659 | A1* | 12/2011 | Hans et al. | 711/114 |
| 2012/0036113 | A1* | 2/2012 | Lillibridge et al. | 707/694 |
| 2012/0089574 | A1* | 4/2012 | Doerner | 707/654 |
| 2012/0158675 | A1* | 6/2012 | Gupta et al. | 707/693 |
| 2012/0226672 | A1* | 9/2012 | Hayashi et al. | 707/698 |
| 2013/0024424 | A1* | 1/2013 | Prahlad et al. | 707/640 |
| 2013/0024680 | A1* | 1/2013 | Heidingsfeld et al. | 713/2 |
| 2013/0124487 | A1* | 5/2013 | Anglin et al. | 707/692 |
| 2013/0246711 | A1* | 9/2013 | Testardi et al. | 711/135 |

OTHER PUBLICATIONS

Jones, Anatomy of Linux Kernel Shared Memory, Apr. 7, 2010, pp. 1-9.*
Thwel, An Efficient Indexing Mechanism for Data Deduplication, 2009, pp. 1-5.*
SBB, An Introduction to the Storage Bridge Bay, 2008, pp. 1-30.*
EMC Data Domain Global Deduplication Array, Jan. 2011, pp. 1-24.*
Crump, Arkeia Source Side and Sliding Window Deduplication, May 19, 2010, pp. 1-2.*
Aronovich, The Design of a Similarity Based Deduplication System, 2009, pp. 1-14.*
Priyadarshini, A Modified and Memory Saving Approach to B+ Tree Index for Search of an Image Database based on Chain Code, Nov. 2010, pp. 5-9.*
Anand, Cheap and Large CAMs for High Performance Data-Intensive Networked Systems. 2010, pp. 1-15.*
Meister, Multi-Level Comparison of Data Deduplication in a Backup Scenario, 2009, pp. 1-12.*

* cited by examiner

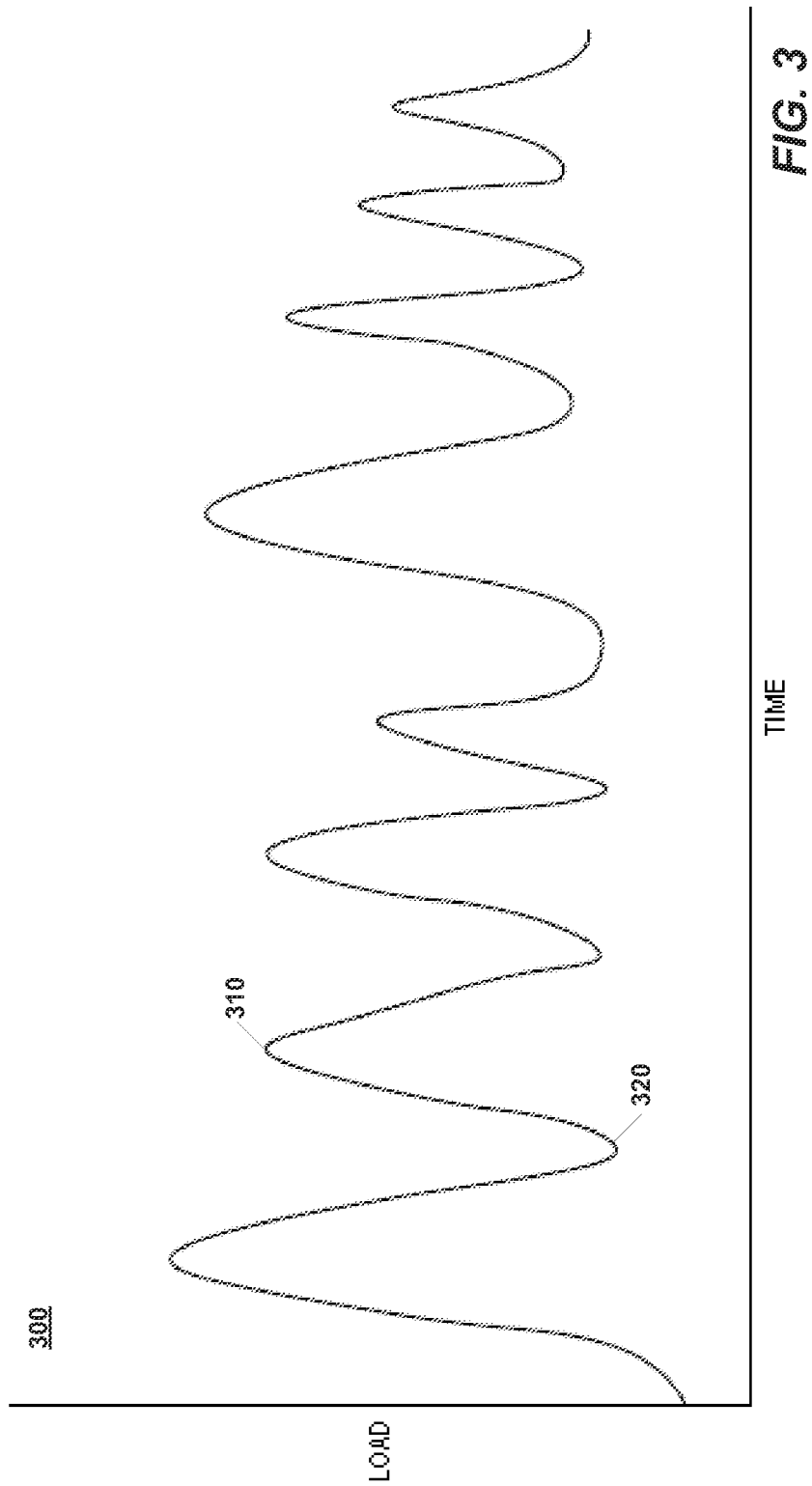

DATA DE-DUPLICATION FOR INFORMATION STORAGE SYSTEMS

CROSS-REFERENCE TO RELATED APPLICATION

This application claims the benefit of U.S. provisional patent application No. 61/476,447, filed on Apr. 18, 2011, and entitled "Data De-Duplication for Information Storage Systems" which is expressly incorporated herein by reference in its entirety.

BACKGROUND

A growing amount of data generated in modern information systems presents considerable challenges with regard to storing, retaining, and managing information. These challenges have given rise to various data management technologies. For example, capacity planning, thin provisioning, and data reduction techniques are applied to improved efficiency in data storage systems. Data compression techniques have also been leveraged to address the magnitude of data stored by data storage systems.

Data de-duplication, also referred to as "de-dupe," is another approach for improving capacity and efficiency in data storage systems. De-duplication is a data reduction technology that can compact a storage footprint by eliminating multiplicities, or copies, in the stored data. Since storage servers are often required to host files and data from multiple clients and users, many files or data elements may reside as multiple copies within the storage system. The copies may be in various seemingly unrelated folders. Even when each of these files is individually compressed, a great deal of efficiency may be obtained by eliminating the duplicated data elements. De-duplication at the file level can be implemented using hints obtained from file level meta-data to identify de-duplication candidate files. However, when dealing with unstructured data or with multiple versions of files that are different but share many blocks of common data, block level de-duplication may be more beneficial. Block level de-duplication may be far more difficult in environments where data is randomly accessed and altered after it has been de-duplicated.

Another concern in de-dupe implementations is related to having all of the eggs in one basket once multiple copies of a data element have been de-duplicated into one copy. Addressing data loss concerns in high performance block-level de-duplicating data storage systems introduces yet another challenge in implementing de-duplication techniques.

It is with respect to these considerations and others that the disclosure made herein is presented.

SUMMARY

Technologies are described herein for eliminating duplicate data within a storage system. The de-duplication technology presented herein can efficiently identify duplicate data within a data storage system and eliminate duplication. Such de-duplication can support substantial storage space consolidation.

According to one implementation, at least one de-duplication data structure that includes a plurality of entries corresponding to a unit of data may be maintained for identifying candidates for de-duplication in a data storage system. Optionally, it may be desirable to coordinate with a kernel module to identify a unit of data for de-duplication and calculate a signature of the identified unit of data. Additionally, the de-duplication data structure may be searched to determine whether the signature of the identified unit of data matches the signature of at least one of the entries in the de-duplication data structure. Upon determining that the signature of the identified unit of data matches, the identified unit of data may be queued for de-duplication in a de-duplication queue. Upon determining that the signature of the identified unit of data does not match, a new entry may be added to the de-duplication data structure corresponding to the identified unit of data. Optionally, the entries of the de-duplication data structure may be reviewed and obsolete entries may be removed from the de-duplication data structure. In addition, after identifying candidates for de-duplication, it may be desirable to coordinate with a kernel module to perform data de-duplication operations.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a system load plot illustrating data storage system load over time according to an embodiment presented herein;

DETAILED DESCRIPTION

Figure 1:
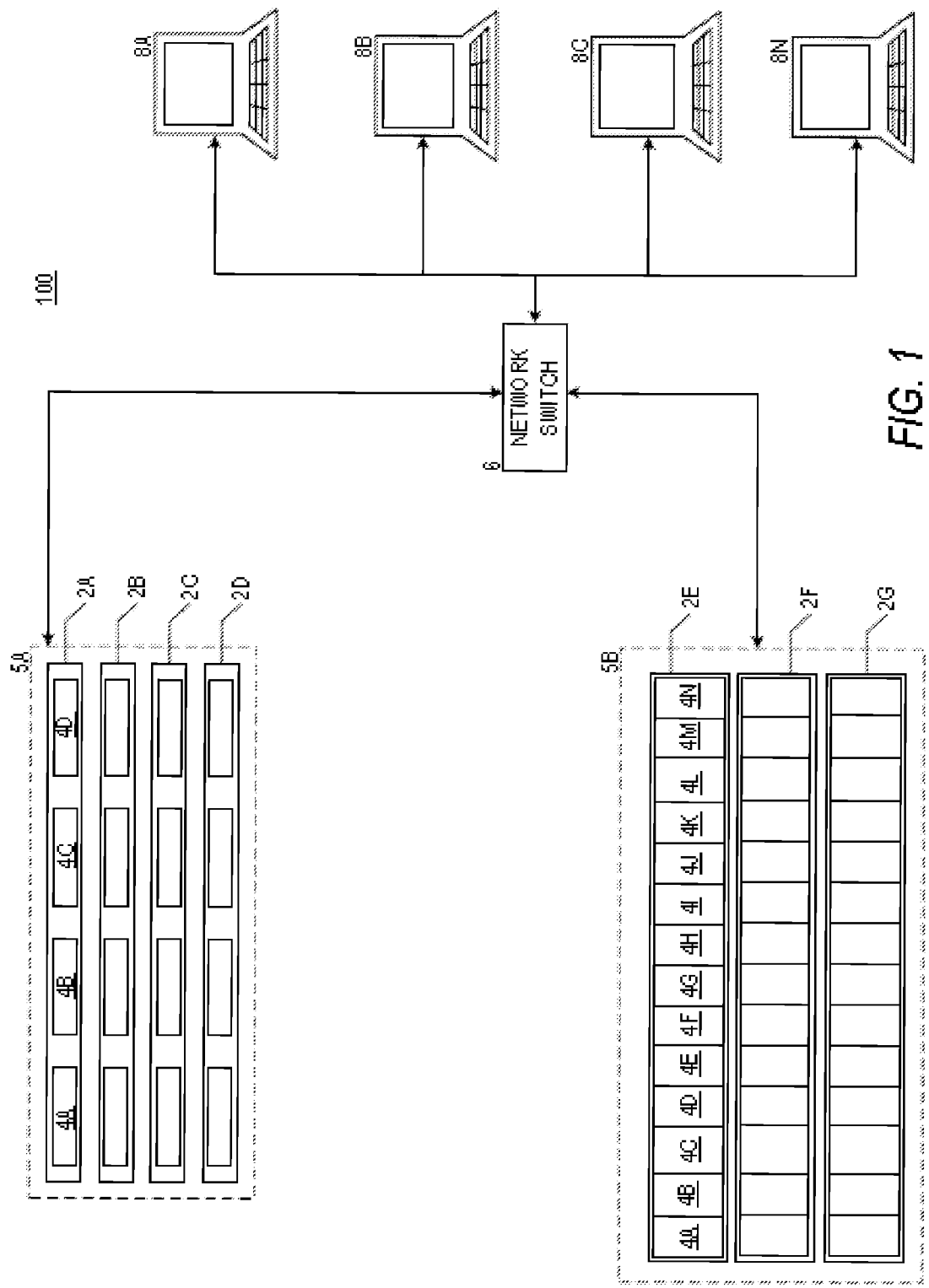
FIG. 1 is a network architecture diagram illustrating aspects of a storage system according to an embodiment presented herein.

The following detailed description is directed to technologies for identifying and eliminating duplicated data within a data storage system. Through the use of the embodiments presented herein, technologies for identifying and eliminating duplicated data within a data storage system can increase storage efficiency while maintaining data protection.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for eliminating duplicated data within a data storage system will be described.

Turning now to FIG. 1, details will be provided regarding an illustrative operating environment for the implementations presented herein, as well as aspects of several software components that provide the functionality described herein for data de-duplication within a data storage server. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface (iSCSI) protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Data de-duplication features may be provided on one or more storage server computers 2A-2G, one or more storage clusters 5A-5B, or one or more client computers 8A-8N. Furthermore, the processes for implementing de-duplication may execute on any of these systems or may operate in a distributed fashion with components executing across two or more of these systems.

Figure 2:
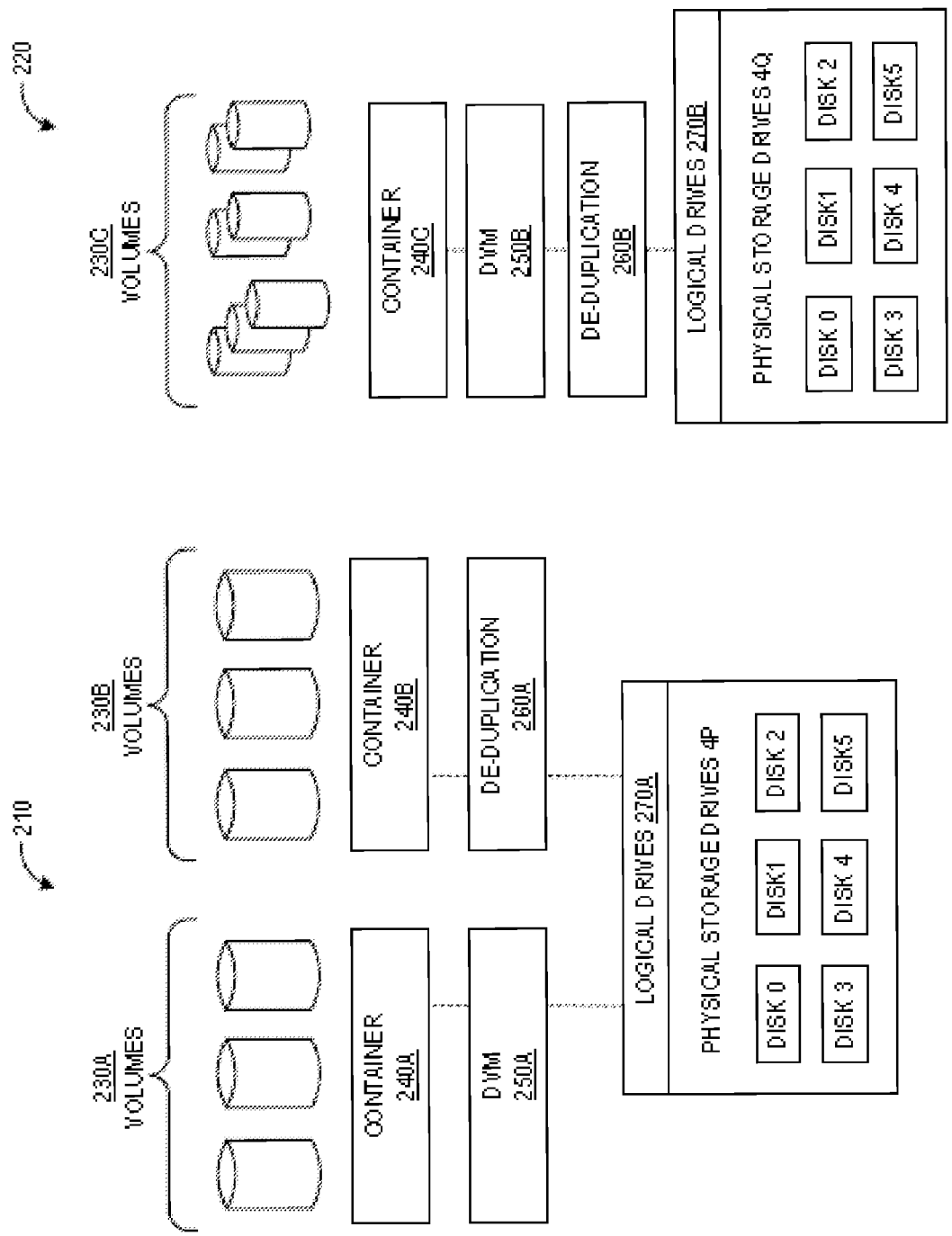
FIG. 2 is a block diagram illustrating two examples of data de-duplication modules operating in conjunction with distributed volume management architectures in data storage systems according to embodiments presented herein.

Referring now to FIG. 2, a block diagram illustrates two examples of a data de-duplication module operating in conjunction with distributed volume management (DVM) architectures in data storage systems according to an embodiment presented herein. A DVM module 250A, 250B can support storage system functionality such as thin provisioning, snapshots, and so forth. A combination architecture 210 can support storage volumes 230A within a container 240A supported by a DVM module 250A. The combination architecture 210 can also support storage volumes 230B within a container 240B supported by a de-duplication module 260A. As such, the combination architecture 210 can support both DVM functionality as well as data de-duplication. The de-duplication module 260A of combination architecture 210 can be provided as a plug-in within a storage stack. The plug-in can be enabled or disabled for any container, thereby differentiating between a DVM class container 240A or a de-dupe class container 240B. Both the DVM class and the de-dupe class may be supported by logical drives 270A abstracted from physical storage drives 4P.

A cascaded architecture 220 can support both data de-duplication and enterprise-class snapshot features. Volumes 230C, and similarly snapshots, within a container 240C may be supported by a DVM module 250B and a de-duplication module 260B. A snapshot layer may be visible to the DVM class but transparent to the de-dupe class. Enterprise class snapshot features along with the data de-duplication technology presented herein can be supported within the cascaded architecture 220. Both the DVM class and the de-dupe class may be supported by logical drives 270B abstracted from physical storage drives 4Q.

Referring now to FIG. 3, a system load plot 300 illustrates data storage system load over time according to an embodiment presented herein. Information lifecycle management (ILM) and workflow management modules may inform de-duplication policies to support robust, scalable, and efficient operation. The policies may provide indicators as to which regions may be candidates for de-duplication and what times may be preferred for scheduling de-duplication operations to reduce undesirable impact on system performance.

De-duplication operations within a storage system can be supported through integration with Storage Resource Management (SRM) features provided within the storage system. SRM functions may include collecting and processing ILM statistics. SRM functions may also provide workflow management to support scheduling for background, or housekeeping, operations performed within the storage system.

SRM features can support de-duplication through access time ILM statistics. These statistics can support de-duplicating data in the reverse order of territories being accessed. Thus, the de-duplication process can take place first for regions that are not being actively used, or have the longest time recorded for their last access. This can reduce, or eliminate, de-duplication of frequently changing data. For performance reasons, it may not be preferable to de-duplicate frequently accessed data. For example, read access to a de-duped region may incur an extra disk or cache read to access the lending map 430 or other related structures as disclosed herein.

De-duplication may be CPU intensive or otherwise impact resources within a storage system. A workflow module within the storage system can support scheduling de-duplication operations. Scheduling de-duplication operation when load on the storage system is low can reduce, or alleviate, impact on production I/O operations of the storage system due to resource consumption by the de-duplication operations. For example, considering the system load plot 300, scheduling de-duplication operations at a time associated with a low point 320 in load may be preferable to scheduling de-duplication operation at a time associated with a high point 310 in the system load.

Figure 4A:
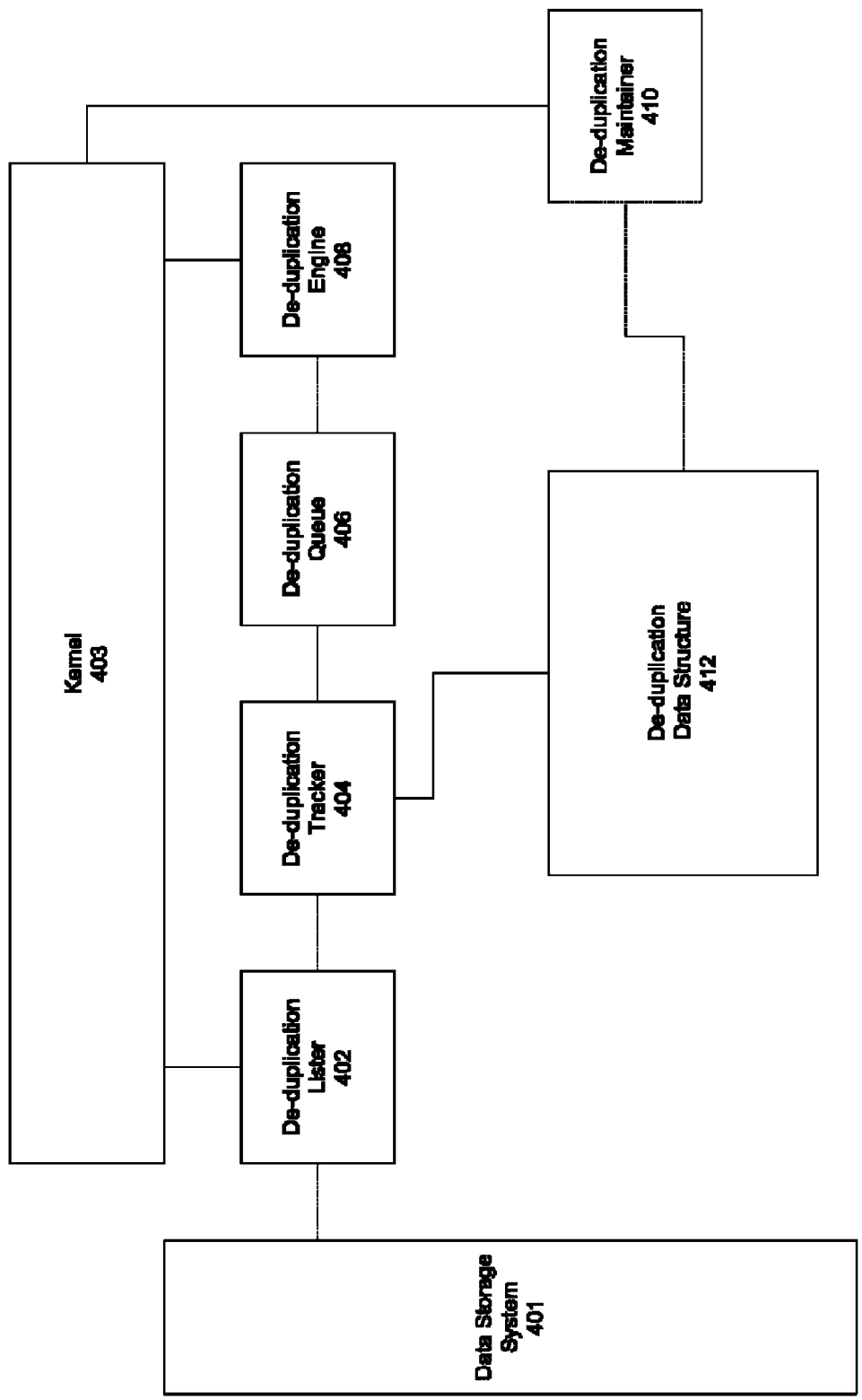
FIG. 4A is an example block diagram illustrating a de-duplication system according to an implementation of the invention.

Referring to FIG. 4A, an example block diagram of de-duplication system according to an example implementation is shown. For example, the de-duplication system may include a de-duplication lister 402, a de-duplication tracker 404, a de-duplication queue 406 and a de-duplication maintainer 410. In addition, the de-duplication system may include a data storage system 401, a kernel 403, a de-duplication engine 408 and a de-duplication data structure 412. The data storage system 401 may be a block storage system, a file system or any other type of storage abstraction. All of the modules and/or components of the de-duplication system are discussed in detail below.

As discussed herein, a de-duplication finder is a background process that uses information about the I/O operations to identify duplicate data and take appropriate action. The de-duplication finder does not directly interact with I/O operations. In addition, the de-duplication finder does not perform the de-duplication operations. Instead, the process of data de-duplication is delegated to lower-level routines in the OS or the kernel, in order to ensure tight integration with the I/O path, and thereby increase performance and decrease overhead. The tasks of the de-duplication finder are, therefore, as follows: to analyze the logical disks, volumes or file systems selected for de-duplication in order to identify duplicate data; and to coordinate with the kernel and OS counterparts in order to perform the de-duplication operations. According to implementations described herein, the de-duplication finder may include the de-duplication lister 402, the de-duplication tracker 404, the de-duplication queue 406, the de-duplication engine 408 and the de-duplication maintainer 410. However, the de-duplication finder is not limited to including the modules and/or components discussed above, and may instead include more or less of the modules and/or components discussed above.

Data de-duplication creates two major types of metadata. The first metadata type is the metadata generated by the de-duplication finder, such as the de-duplication data structure 412, which may be one or more B+ trees, for example. The de-duplication metadata may be stored in a separate partition on the data storage system 401. The partition may either be a raw file system, such as a file system on top of RAID, or may be a managed file system, such as a file system on top of DVM on top of RAID. The managed file system has the advantage that space allocated to it is thin-provisioned such that physical storage space for the entire file system does not need to be allocated at one time. The second metadata type is the kernel-level metadata that is associated with de-duplication operations, including the de-duplication map table and the de-duplication bitmap. The second metadata type is stored for each logical disk because the second metadata type is accessed by the kernel below the level of the DVM, and therefore, is directly associated with the physical disks on which the second metadata type resides.

A user may specify the logical disks that are to be included in the scope of de-duplication. For example, through a management interface, the user may add various logical disks to de-duplication classes. In addition, the user may remove various logical disks from de-duplication classes, though this operation may only be done with certain limitations. A de-duplication class is uniquely associated with a canister, i.e., with a controller that is part of the data storage system. In a single-controller system, there is a single de-duplication class. However, in an Storage Bridge Bay (SBB) system, there are two de-duplication classes. Various tools, such as the de-duplication finder, may run as a single instance per de-duplication class. De-duplication falls under the scope of SBB. Thus, if an SBB device has two canisters and one controller fails, the second controller takes over the control of I/O operations to the failed controller, which necessitate the exchange of some de-duplication data, such as the de-duplication bitmaps and the de-duplication map table. However, the operation of further de-duplication on the canister corresponding to the failed controller will not be performed until the controller comes back online. Each de-duplication class exposes a virtual logical disk, i.e., a logical representation of the space that is made available after de-duplication.

The management interface may also be used to control timing of de-duplication processing. For example, a de-duplication schedule may set a specific timing (i.e., weekly, daily, based on workflow, etc.) for identifying candidates for de-duplication (i.e., by enabling the de-duplication lister 402) and for processing the candidates (i.e., by enabling the de-duplication queue 406). Alternatively, a user may force de-duplication by command (i.e., enabling the de-duplication lister 402 and the de-duplication queue 406). Additionally, through the management interface, it may be possible to conduct a de-duplication dry run by enabling the de-duplication lister 402 and the de-duplication tracker 404. A dry run may identify candidates for de-duplication and queue the candidates in a list maintained by the de-duplication queue 406 but not enable de-duplication of the candidates. The management interface may also facilitate collection of de-duplication statistics.

De-duplication may be performed either in-line (or concurrently with I/O operations) or post-processing (or subsequently to I/O operations). The de-duplication processes are the same whether performed in-line or post-processing. When de-duplication is performed in-line, the overhead to perform the I/O operations increases and the speed at which the I/O operations may be performed decreases. In particular, the written data block must be compared to the existing data blocks to determine if a candidate for de-duplication exists concurrently with the I/O operation. In addition, when de-duplication is performed in-line, there is a risk of invalidating de-duplicated blocks of data. For example, if data is written to a block of data that has been previously de-duplicated, the de-duplicated blocks of data will no longer identical. Accordingly, the blocks of data must be duplicated concurrently with the I/O operation. However, when de-duplication is performed post-processing, de-duplication may be periodically performed and may also be configured based on system workflow to reduce the impact on system performance.

Block level de-duplication may be beneficial when de-duplicating unstructured data or multiple versions of files that share blocks of common data. In the example implementation discussed herein, a 32 TB portion of storage space may undergo block level de-duplication. During block level de-duplication, the 32 TB portion of storage space may be de-duplicated in 64 KB chunks. However, it should be appreciated that the size of the portion of storage space and the size of the chunks may be greater than or less than 32 TB and 64 KB, respectively. Accordingly, in the example implementation, the sizes of the portion of storage space and the chunks are provided only as an illustration.

It may be desirable to ensure that de-duplication does not pose an unmanageable overhead to I/O operation performance because of background reads during post-processing de-duplication. For example, when de-duplicating the 32 TB portion of the storage space in 64 KB chunks, 5.12 million chunks (i.e., 32 TB divided by 64 KB) must be de-duplicated. Assuming the de-duplication reads are constrained to approximately 32 MB/s, a full pass of the 32 TB portion of the storage space will take about 12 days. If the size of the portion of storage space to be de-duplicated is smaller, the full pass cycle time will also be significantly lower. Thus, de-duplication may be performed infrequently in accordance with a predetermined schedule. For example, de-duplication operations may be performed once a week. In addition, the workflow management module may be used to ensure that de-duplication occurs only when the system is not in use or during period of lower use. De-duplication may also be forced, i.e., de-duplication may be performed in response to an explicit user command. In this case, the de-duplication is triggered immediately.

The de-duplication lister 402 may be responsible for identifying and reading chunks and then calculating signatures for the chunks. The de-duplication lister 402 may coordinate with the kernel 403 to identify chunks for de-duplication from a variety of different sources. For example, the de-duplication lister 402 may identify a chunk during an I/O operation. This may occur, for example, during in-line processing. Alternatively, the de-duplication lister 402 may identify a chunk based on information received from ILM and workflow management modules. As discussed above, ILM and workflow management modules may inform de-duplication policies providing indications of candidates for de-duplication. For example, de-duplication policies may be based on ILM statistics regarding frequency and time of last access. It may be desirable, for example, to perform de-duplication on more stable chunks, i.e., chunks that are infrequently accessed and/or have longer recorded times of last access. Alternatively, the de-duplication lister 402 may identify a chunk based on information received from a patrol read. Patrol reads are periodic consistency checks performed on RAID arrays. Thus, the de-duplication lister 402 may identify the chunks periodically read during patrol reads.

Alternatively or additionally, the de-duplication lister 402 may coordinate with the kernel 403 using a context-based application programming interface (API), for example. The context-based API may determine the last "logical chunk" (i.e., the logical disk and chunk combination) that was read by the de-duplication lister 402 and may return the next chunk (or chunks) to read. To perform this operation, the kernel 403 may consult the volume tables (to identify written chunks), the timestamps (to ignore very old chunks) and the de-duplication re-write bitmap (to ignore chunks that have already been updated in the de-duplication tracker 404). For example, the kernel 403 may consult the First Write Bitmap (FWB) that indicates written chunks and/or the re-write bitmap that is updated by the de-duplication tracker 404 after the de-duplication data structure 412 is updated.

Identifying duplicate regions can be computationally time consuming. As such, de-duplication may be performed as a background process or as a background thread. Candidate regions for de-duplication can be identified by calculating a signature for multiple regions and searching for matching signatures. A signature can be a cyclic redundancy check (CRC), a checksum, a hash, a repetition code, a parity code, a hamming code, a substitution code, or any other deterministic signature generated over the data within the provision. Alternatively, a specified sampling of the data may be used as a signature. Generally, a signature can be considerably smaller than the actual data within a region. The reduced size signature can provide a mechanism for quickly checking for data matches without doing a brute force comparison of every possible region with every other region.

After identifying and reading the chunk, the de-duplication lister 402 may calculate a signature for the chunk. For example, the de-duplication lister 402 may call a kernel API to read the chunk and compute the signature of the chunk. The signature may then be returned to the de-duplication lister 402. Duplicates may be identified by using a system of signatures, which may be compared to match whether or not two chunks of data are identical. The signatures may be computed in a number of ways, depending on the amount of data security needed. For example, for high-end applications, a hashing algorithm such as SHA1 may be used to generate a 20-byte hash. SHA1 guarantees that hash collisions occur only in the rare occasion that the matching chunks are totally unrelated. Thus, SHA1 may prove to be a good hashing strategy for structured data that is stored in most storage devices. However, SHA1 has the disadvantage that it is relatively computationally expensive, and so a simpler signature such as CRC-32 may be used to hash the data. In order to increase the spatial diversity of the hash, a combination of four CRC-32 hashes, each taken over different sections of the chunk, may be used in order to create a 16-byte hash for de-duplication. The combination of four CRC-32 hashes is computationally much easier than SHA1, and its performance may be sufficient for detecting duplicates without significant overlaps if the data is truly random. It should be understood that SHA1 and CRC-32 are only two example signatures and that other signatures may be utilized.

The de-duplication lister 402 may communicate information about the chunks, such as a chunk identifier, signature and timestamp, to the de-duplication tracker 404. As discussed below, this information may be used to build the de-duplication data structure 412. Additionally, the de-duplication lister 402 may be rate-limited. For example, the de-duplication lister may be controlled through a workflow interface or may be triggered at periodic intervals. The de-duplication lister 402 may also parametrized. For example, instead of reading data from chunks, both the enumeration and the data read operations may operate on files, blocks or any other kind of storage medium.

The de-duplication tracker 404 may be responsible for managing the de-duplication data structure 412. The de-duplication data structure 412 may, for example, be an organized data dictionary including information about the chunks, such as the chunk identifier, signature and timestamp. The de-duplication tracker 404 may use the de-duplication data structure 412 to determine whether two chunks are candidates for de-duplication (i.e., containing duplicated data). For example, the de-duplication data structure 412 may be a B+ tree. However, it should be understood that the de-duplication data structure 412 may be a different type of data structure.

Figure 4B:
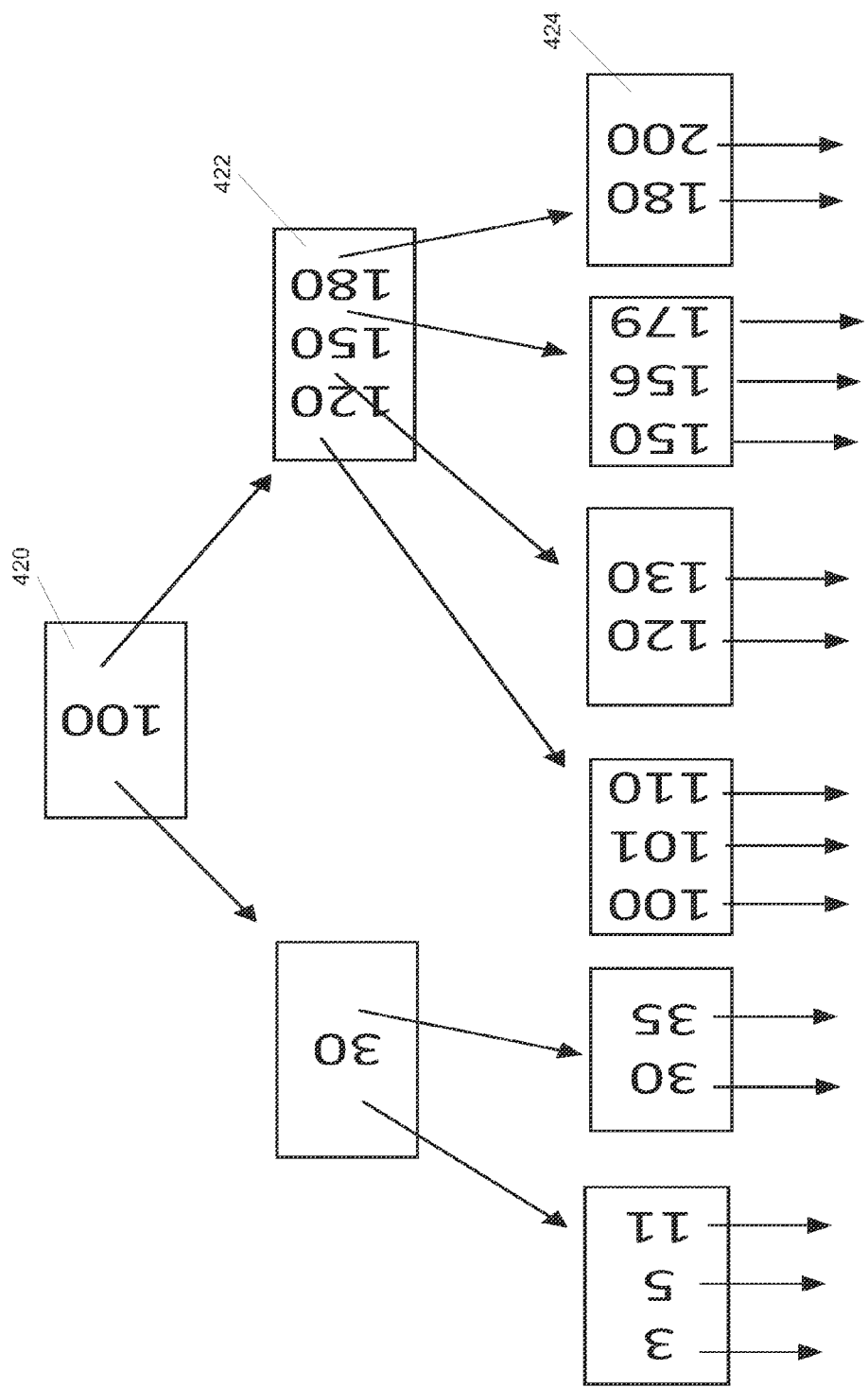
FIG. 4B is a block diagram illustrating a B+ tree according to an example implementation.

A B+ tree is a balanced multi-way search tree that is optimized for minimizing disk accesses. An example B+ tree is shown in FIG. 4B. The B+ tree includes a root node 420, internal nodes 422 and leaf nodes 424. The B+ tree is height balanced, with all leaf nodes 424 at the same level. In addition, all of the data is stored in the leaf nodes 424 of a B+ tree, as opposed to the root node 420 and the internal nodes 422. The B+ tree guarantees that every node in the tree will be full at least to a certain minimum percentage, which improves space efficiency and reduces the typical number of disk fetches necessary during a search or update operation.

The de-duplication tracker 404 may manage the de-duplication data structure 412, which may be a B+ tree. For example, the B+ tree may store information about the chunks, such as the chunk identifier, signature and timestamp, in the leaf nodes 424. The de-duplication tracker 404 may then search the B+ tree, and particularly the signatures in the leaf nodes, each time it receives information about a chunk to identify candidates for de-duplication. If the signature of a received chunk matches the signature stored in one of the leaf nodes, then the received chunk may be a candidate for de-duplication. If the signature of a received chunk does not match any of the signatures stored in any of the leaf nodes, then a new leaf node may be added to the B+ tree.

Figure 4C:
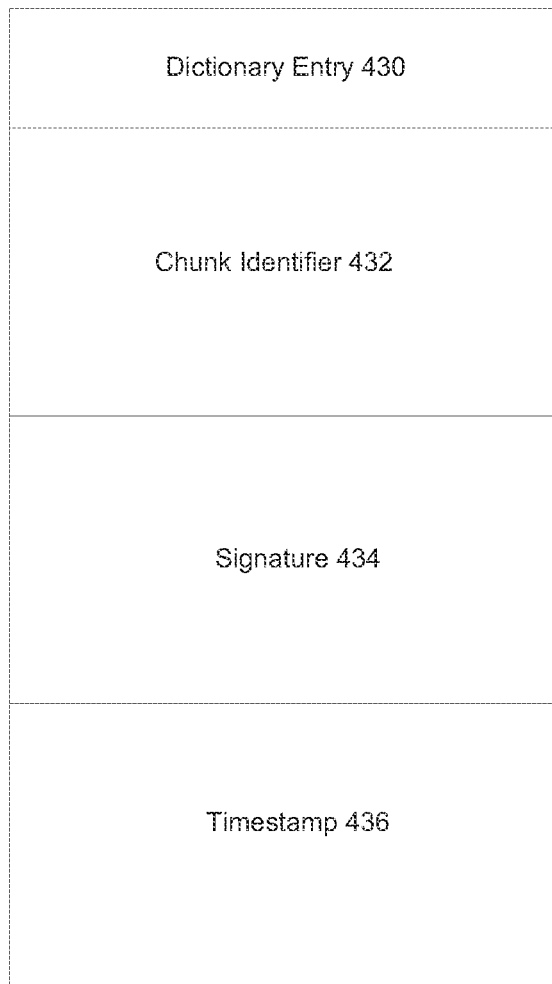
FIG. 4C is a block diagram illustrating a dictionary entry in a de-duplication data structure according to an example implementation.

The de-duplication data structure 412 may be stored in a separate partition of the data storage system 401. Thus, when de-duplicating a 32 TB portion of storage space in 64 KB chunks, the characteristics of the de-duplication data structure 412 may be determined as follows. The 32 TB portion of storage space includes approximately 5.12 million chunks (i.e., 32 TB/64 KB). An example dictionary entry in a de-duplication data structure 412 (or leaf node in a B+ tree) is shown in FIG. 4C. For each chunk, the dictionary entry 430 (i.e., a leaf in a B+ tree) in the de-duplication data structure 412 may include a chunk identifier 432 such as a logical address (4 Bytes), a signature 434 (16-20 Bytes) and a timestamp 436 (4-8 Bytes). The timestamp 436 may indicate the time of computation of the signature 434. Because the de-duplication tracker 404 does not perform actual de-duplication, the de-duplication tracker 404 may track timestamps so that the de-duplication engine 408 may determine whether the signature 434 is out of date. It may be desirable for the signatures 434 and the volume data to have synchronized timestamps. Based on the above, each dictionary entry 430 may be approximately 32 Bytes. Accordingly, the size of the partition necessary for storing the de-duplication data structure 412 will be at least 64 GB (i.e., 5.12 million times 32 Bytes). However, it should be understood that this does not account for the storage space required to store any of the root and internal nodes of the B+ tree.

In addition, assuming a page size of 4 KB, there will be 128 dictionary entries 430 per page (i.e., 4 KB/32 Bytes). Therefore, when the de-duplication data structure 412 is a B+ tree, there will be 128 leaf nodes per page. Accordingly, the B+ tree will have an order of 128, and the height of the B+ tree may be calculated according to Eqn. (1) below, where "B" is the order of the B+ tree and "h" is the height.

$$B^{h-1} = 128^{h-1} = (2^7)^{h-1} > \text{number of leaf nodes} \quad (1)$$

In this example, assuming 5.12 million leaf nodes may be required, the height of the B+ tree will be 6. In other words, the number of nodes (or reads) between the root node and the leaf nodes is 6. Thus, the de-duplication tracker 404 will be required to traverse 6 nodes every time a chunk is received to determine whether the received node is a candidate for de-duplication.

Figure 4D:
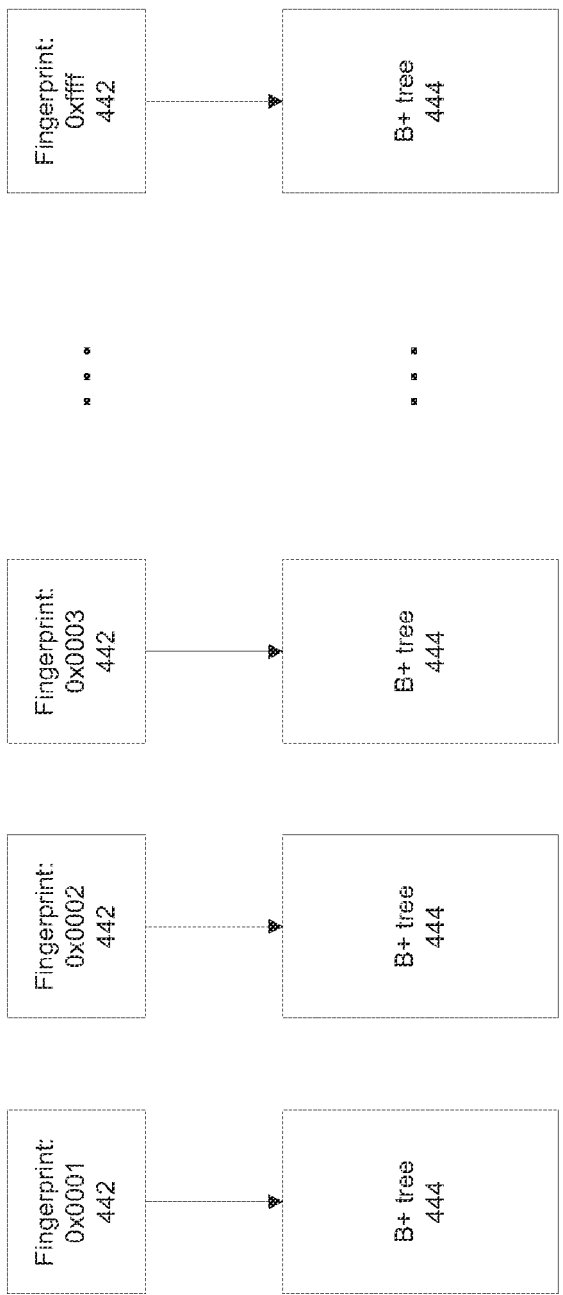
FIG. 4D is an example block diagram illustrating a plurality of B+ trees according to an example implementation.

In order to reduce the height of the B+ tree, a plurality of B+ trees may be maintained. For example, a B+ tree may be maintained for each hash head or fingerprint. Each B+ tree may be stored in a file addressed by the 2-Byte hash head or fingerprint (i.e., "b+3411.txt" may contain the B-plus tree having the first two bytes as 0x3411). A block diagram of a plurality of B+ trees 444 for each hash head or fingerprint 442 is shown in FIG. 4D. The hash head or fingerprint may be the first two or four bytes of the signature 434. When using a 2-Byte hash head or fingerprint, there will be $2^{16}$ possible hash heads or fingerprints, and therefore, the 5.12 million leaf nodes may be distributed, on average, among $2^{16}$ (or 64,000) B+ trees. Accordingly, each B+ tree will include fewer leaf nodes (i.e., 5.12 million/$2^{16}$). In this example, using Eqn. (1) above, the height of the B+ tree will be reduced from 6 to 3. Thus, by managing B+ trees for each hash head or fingerprint, the B+ trees are more space efficient, and the de-duplication tracker 404 will be required to traverse fewer nodes every time a chunk is received to determine whether the received node is a candidate for de-duplication.

Additionally, the de-duplication tracker 404 may have multiple threads, which may receive signature information from user-mode and kernel-mode processes. The de-duplication lister 402 may operate via a socket API. For example, the de-duplication lister 402 may connect to the socket and feed chunk information through the socket to the de-duplication tracker 404. Other background processes, such as snapshot-assisted replication (SAR) and ILM, may also connect to the de-duplication tracker via the socket interface. In addition, to listen to kernel-mode updates of signatures (i.e., for in-line processing), the de-duplication tracker 404 may also have an input/output control (IOCTL) interface into the kernel 403, through which the kernel 403 may feed the de-duplication tracker 404 data in an identical format as the de-duplication lister 402.

After determining that a chunk may be a candidate for de-duplication (i.e., the signature of the received chunk matches a signature in the B+ tree), the de-duplication tracker 404 may communicate this information to the de-duplication queue 406. In addition, the timestamp 436 may indicate the time of computation of the signature 434. Because the de-duplication tracker 404 does not perform actual de-duplication, the de-duplication tracker 404 may track timestamps so that the de-duplication engine 408 may ultimately determine whether the signature 434 is out of date. It may be desirable for the signatures 434 and the volume data to have synchronized timestamps.

The de-duplication queue 406 may be responsible for maintaining a list of candidate chunks for de-duplication. In particular, the de-duplication queue 406 may maintain a list of chunks identified for de-duplication based on matching signatures by the de-duplication tracker 404, for example. The de-duplication queue 406 may coordinate with the de-duplication engine 408 and the kernel 403 to perform de-duplication. The de-duplication engine 408 may be responsible for processing the list of candidates for de-duplication maintained by the de-duplication queue 406 and perform de-duplication in conjunction with the kernel 403. For example, the de-duplication schedule may periodically set a time (i.e., weekly, daily, based on workflow, etc.) for processing the list of candidate chunks maintained by the de-duplication queue 406. Alternatively, processing of the list of candidate chunks maintained by the de-duplication queue 406 by specific command may be forced by command using, for example, the de-duplication management interface discussed above.

The de-duplication maintainer 410 may be responsible for periodically examining the de-duplication data structure 412, such as the B+ tree, and removing invalid, duplicate and aged entries, such as leaf nodes in the B+ tree. After removing invalid, duplicate and aged dictionary entries, the de-duplication maintainer 410 may rebalance the de-duplication data structure 412. In particular, the de-duplication data structure 412 may need to be rebalanced when it is a B+ tree due to deleting one or more of the leaf nodes. The de-duplication maintainer 410 may lock the de-duplication data structure 412 during operations so that the de-duplication tracker 404 is incapable of modifying the de-duplication data structure 412. The de-duplication maintainer 410 may periodically run in the background in order to minimize load on the system. The de-duplication maintainer 410 may be a thread that runs during periods of reduced system load, for example.

The de-duplication data structure 412 is an organized data dictionary including information about the chunks, such as the chunk identifier, the signature and the timestamp, with the primary key being the signature. It may be possible that duplicate entries in the de-duplication data structure 412 may be created for the same chunk (i.e., multiple dictionary entries with the same chunk identifier) at different times such as, for example, when data is subsequently written to a chunk. Duplicating entries in the de-duplication data structure 412 may result in an explosion of storage space required for storing the de-duplication data structure 412. Thus, the de-duplication maintainer 410 may remove duplicate dictionary entries from the de-duplication data structure 412. In addition to duplicate dictionary entries, dictionary entries in the de-duplication data structure 412 may become invalid. For example, when storage space is freed in the DVM due to volume deletions, container deletions and/or logical disk deletions, the de-duplication maintainer 410 may remove the invalid dictionary entries from the de-duplication data structure 412. The de-duplication maintainer 410 may also remove dictionary entries that are older than a predetermined age from the de-duplication data structure 412. In particular, because aging occurs throughout the de-duplication system, and it is more likely to find duplicate chunks among temporally correlated data (i.e., chunks written close to each other in time), older data may not need to be retained by the de-duplication system.

Although the de-duplication data structure 412 may include invalid, duplicate and/or aged dictionary entries, and the de-duplication tracker 404 may identify candidates for de-duplication based on the invalid, duplicate and/or aged dictionary entries, data integrity will remain intact. In particular, the de-duplication finder is not responsible for de-duplicating data. Instead, de-duplication is delegated to lower-level routines in the OS or the kernel. The kernel 403, therefore, may perform a final check (i.e., ensure that the chunks are indeed duplicates) before performing de-duplication. It should also be understood that when de-duplication data is stored as a golden copy, the potential for multiple signatures representing the same chunk may be much reduced. Additionally, when the de-duplication finder nominates a candidate for de-duplication to the kernel 403, and the kernel 403 rejects the candidate because the data is found to not be a duplicate during a final check, the corresponding dictionary entry may be removed from the de-duplication data structure 412 altogether. Optionally, the dictionary entry may be modified and written back to the de-duplication data structure 412.

Referring now to FIGS. 5A-D, additional details will be provided regarding the embodiments presented herein for finding duplicated data within a data storage system. In particular, FIGS. 5A-D are flow diagrams showing a routine that illustrates aspects of a process for finding duplicated data in a data storage system according to one example implementation of the invention. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

Figure 5A:
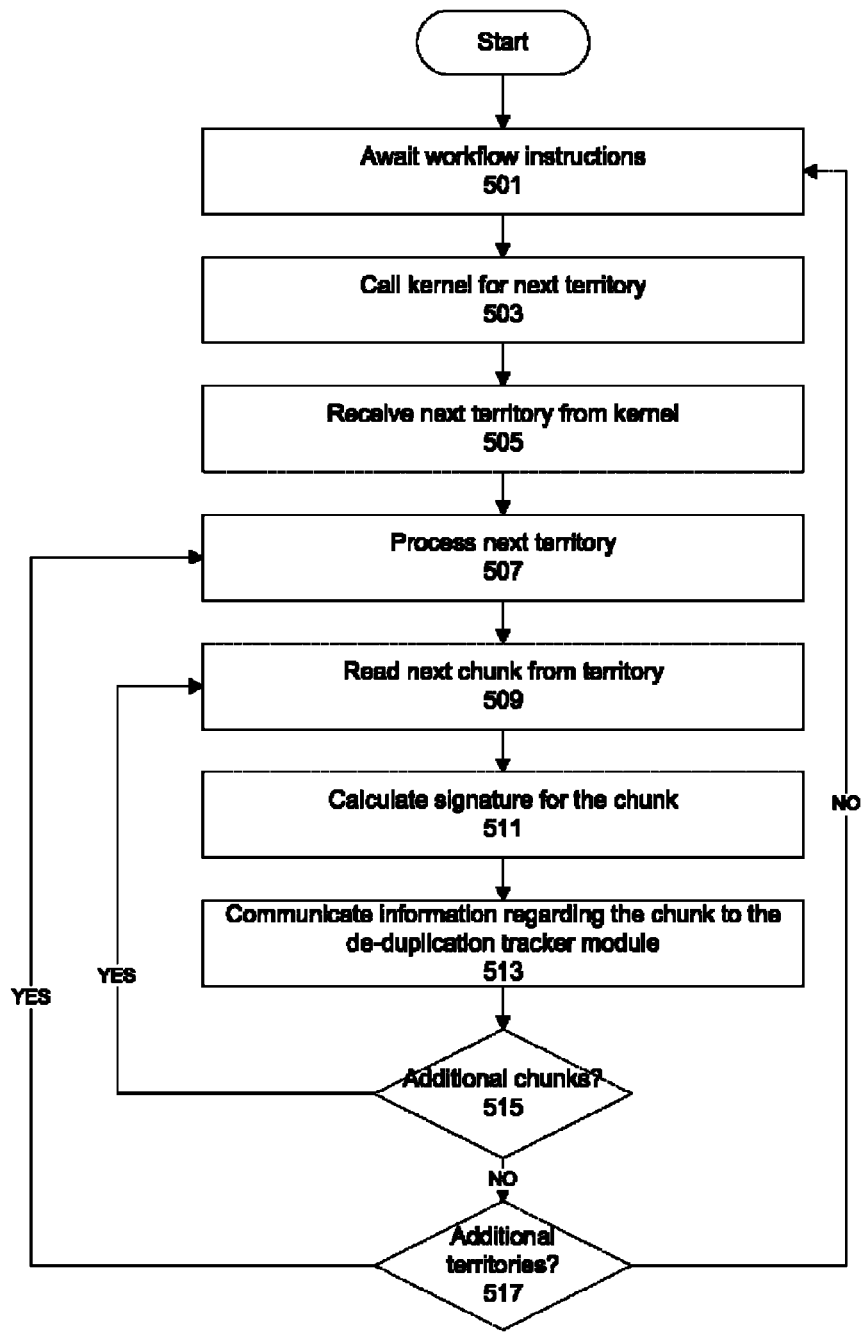
FIGS. 5A-D illustrate flow diagrams showing routines for finding duplicated data in a data storage system according to an example implementation.

FIG. 5A illustrates an example routine for identifying chunks for de-duplication. This routine may be performed by the de-duplication lister 402 discussed above, for example. At 501, the module may await workflow instructions. For example, a schedule may dictate periodic times for identifying chunks for de-duplication such as weekly, daily, or any other predetermined time period (i.e., periods of low system load). Alternatively, the process for identifying chunks for de-duplication may begin upon command. At 503, a call may be made to the kernel module for the next territory. Prior to calling the kernel module for the next territory, a determination may be made as to the territory processed last in time in order to provide context. As discussed above, the kernel module may identify territories for de-duplication based on I/O operations, ILM information or patrol reads. At 505, the next territory may be received from the kernel module, which may then be stored in memory before processing the territory.

After receiving the next territory from the kernel module, the territory may be processed at 507. For example, at 509, the next chunk may be read from the territory. The next chunk may be, for example, a 64 KB portion of physical storage space. At 511, a signature such as SHA1 or CRC-32 or any other signature may be calculated for the chunk. The signature may be considerably smaller than the actual data within the chunk, and therefore, the signature may provide a mechanism for more quickly determining whether the chunk is a duplicate chunk (i.e., contains the same data as another chunk in the data storage system). After calculating the signature for the chunk, information regarding the chunk such as the chunk identifier (i.e., logical address), the signature and the timestamp may be communicated to a module that maintains the de-duplication data structure, such as the de-duplication tracker discussed above. At 515, a determination may be made as to whether there are additional chunks in the territory that have not been processed. If YES, the routine may proceed to 509 and read the next chunk from the territory. If NO, the routine may proceed to 517 and a determination may be made as to whether there are additional territories that have not yet been processed. If YES, the routine may proceed to 507 so that the next territory may be processed. If NO, the routine may proceed to 501 to await workflow instructions.

Figure 5B:
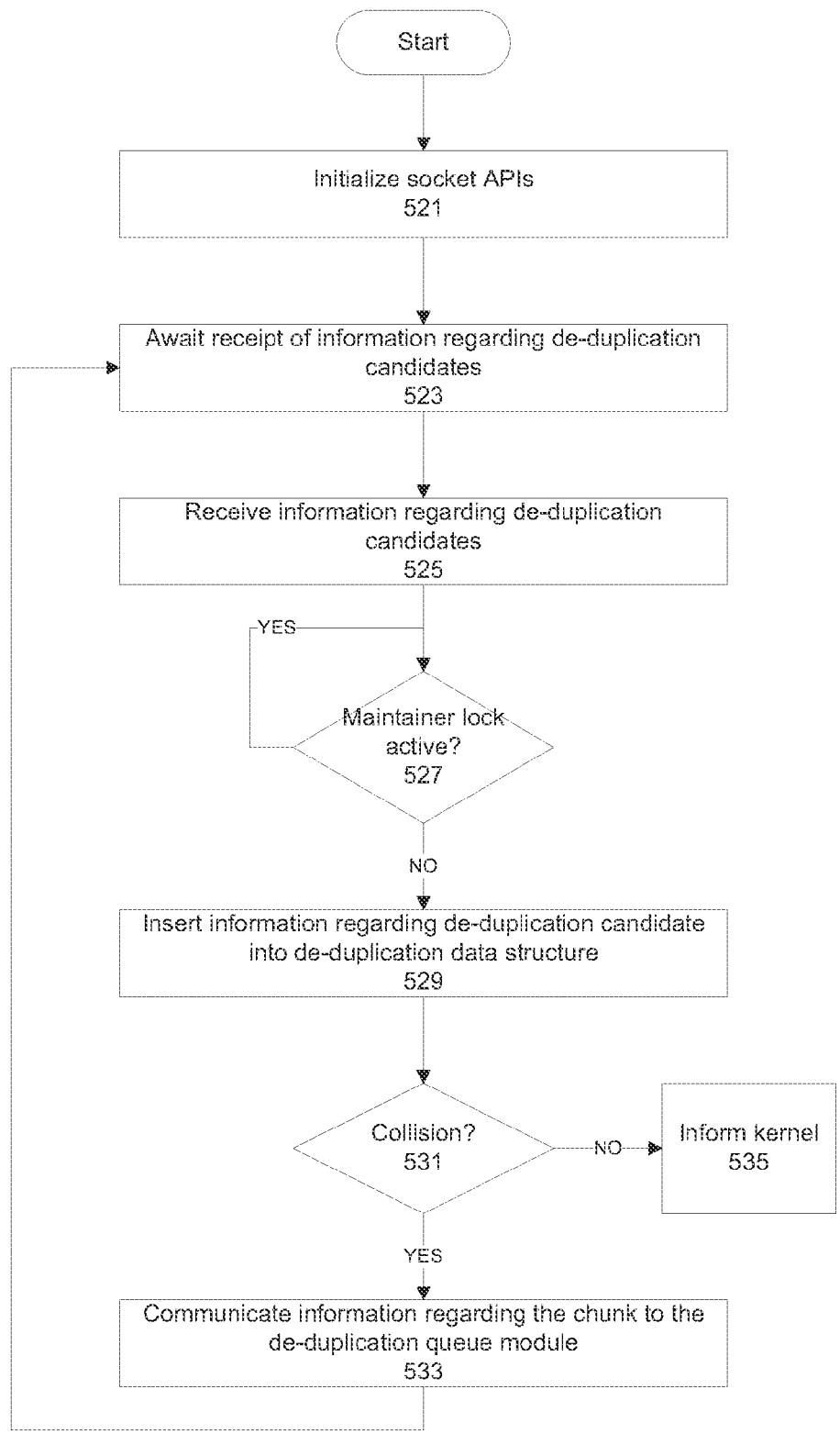

FIG. 5B illustrates an example routine for identifying candidates for de-duplication. This routine may be performed by the de-duplication tracker discussed above, for example. At 521, socket APIs may be initialized. For example, a socket API may be initialized for receiving information regarding the chunks such as the chunk identifier, the signature and the timestamp, which may be determined as discussed above with regard to FIG. 5A. Alternatively, it may be possible to initialize the IOCTL interface to the kernel module for receiving information regarding the chunks such as the chunk identifier, the signature and the timestamp during in-line de-duplication processing. At 523, after initializing socket APIs, the module awaits receipt of the information regarding de-duplication candidates. At 525, the information regarding de-duplication candidates such as the chunk identifier, the signature and the timestamp may be received. For example, the information regarding de-duplication candidates may be the information stored in each dictionary entry in the de-duplication data structure.

At 527, a determination may be made as to whether a de-duplication maintainer lock is active. The de-duplication maintainer lock is discussed below with regard to FIG. 5D. If the maintainer lock is active, the process may wait for the maintainer lock to be released. If the maintainer lock is not active, at 529, the information regarding the de-duplication candidates may be inserted into the de-duplication data structure. The de-duplication data structure may be one or more B+ trees, for example. A search of the de-duplication data structure may be performed based on the chunk signature. If one of the dictionary entries in the de-duplication data structure, such as a leaf node of the B+ tree, includes the signature of the chunk, then a collision occurs at 531. When a collision occurs (i.e., the signature of the chunk matches the signature included in one of the dictionary entries), the chunk may be a candidate for de-duplication. Accordingly, at 533, the chunk may be marked as a candidate for de-duplication and information regarding the chunk may be communicated to the de-duplication queue module. If the collision does not occur, the information regarding the chunk may be stored as a new dictionary entry in the de-duplication data structure. In addition, at 535, the kernel module may be informed that a new dictionary entry has been made in the de-duplication data structure.

Figure 5C:
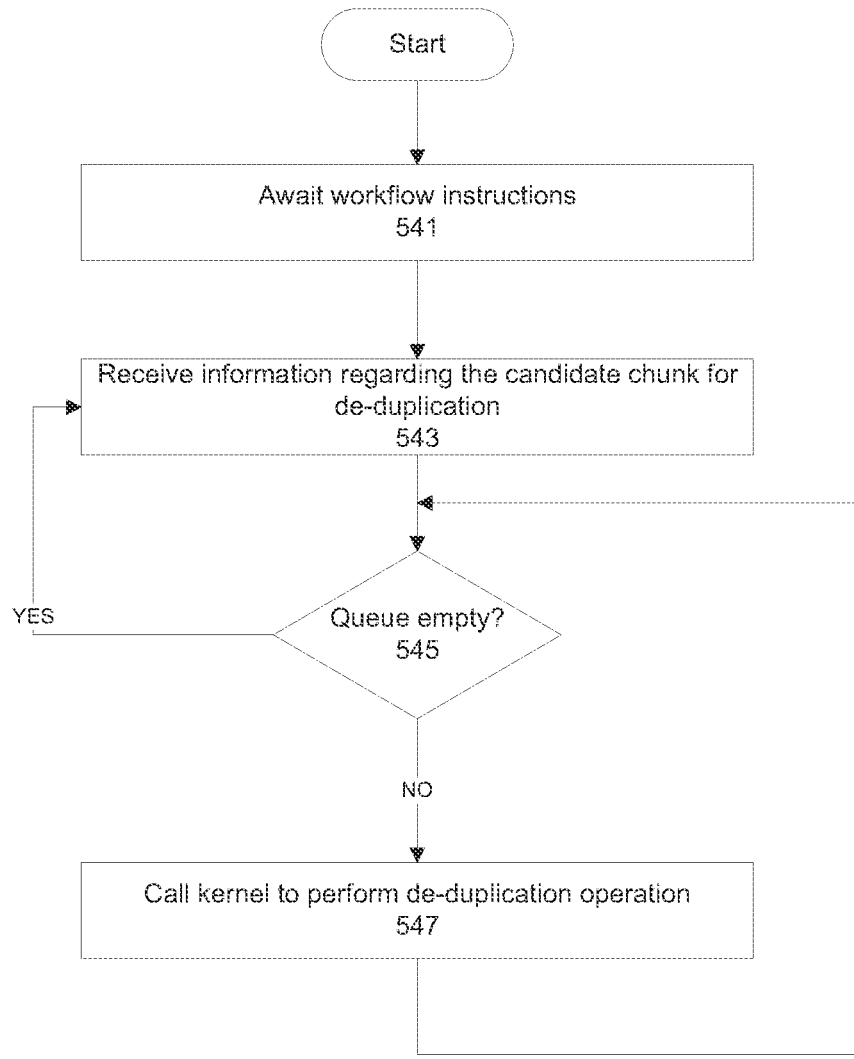

FIG. 5C illustrates a routine for managing the de-duplication queue. This routine may be performed by the de-duplication queue discussed above, for example. At 541, the module may await workflow instructions. As discussed above, a schedule may dictate performance of the de-duplication operations. For example, de-duplication operations may be performed periodically, such as daily, weekly, or at other predetermined time periods. Alternatively, de-duplication operations may be performed on command. At 543, information regarding candidates for de-duplication may be received. When the signature of a chunk matches the signature included in one of the dictionary entries in the de-duplication data structure, a candidate for de-duplication may exist. Information regarding the candidate chunk such as the chunk identifier, the signature and the timestamp may be communicated to the de-duplication queue. At 545, a determination is made as to whether the de-duplication queue is empty. If YES, the routine may proceed to 543 and await receipt of information regarding candidates for de-duplication. If NO, a call may be made to the kernel module to perform de-duplication operations. The de-duplication finder delegates the de-duplication operations to lower-level processes in the OS and the kernel module. Accordingly, the de-duplication queue works in coordination with the kernel module to perform de-duplication operations.

Figure 5D:
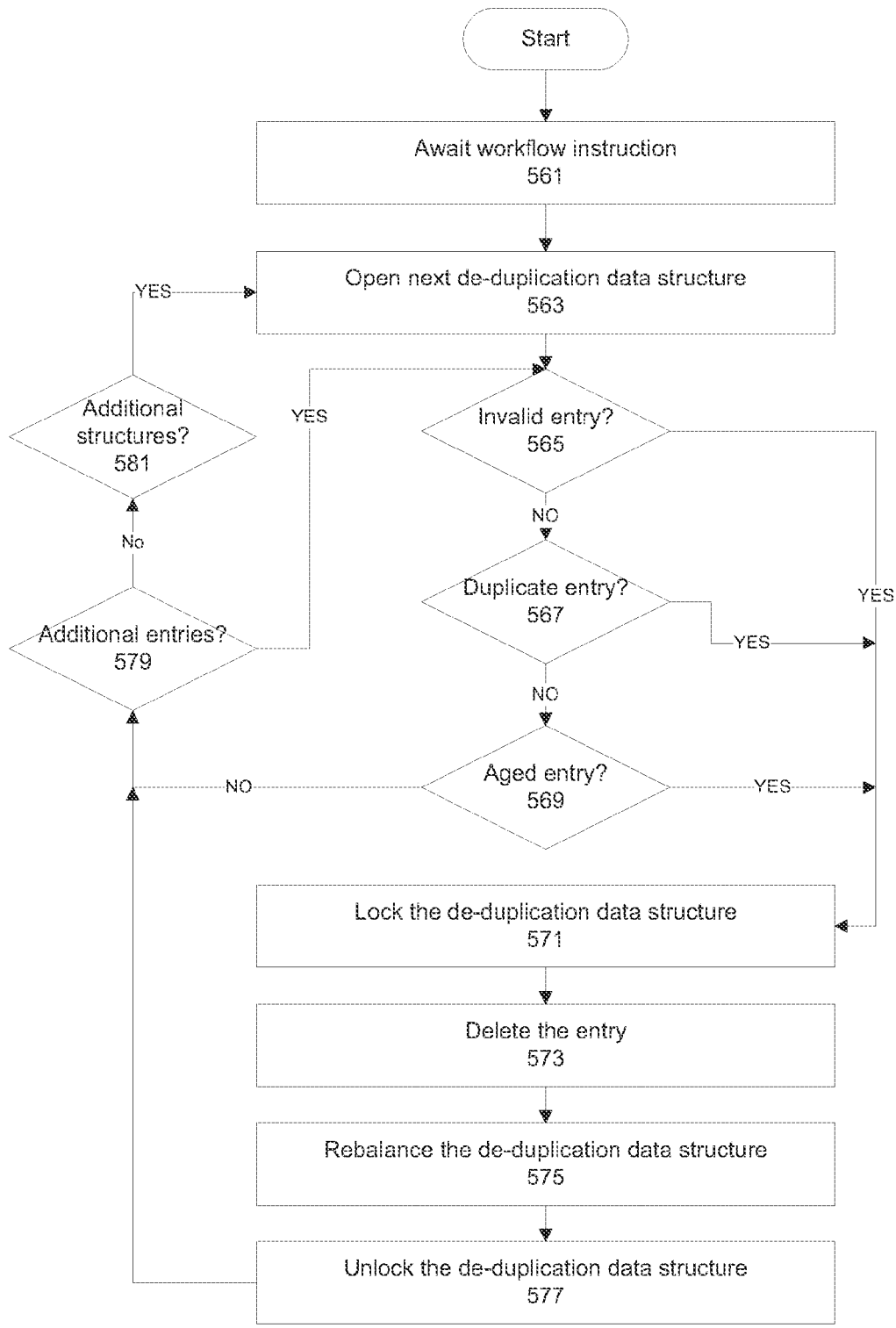

FIG. 5D illustrates a routine for maintaining the de-duplication data structure. This routine may be performed by the de-duplication maintainer discussed above, for example. At 561, the module may await workflow instructions. For example, a schedule may dictate performance of de-duplication operations or the de-duplication operations may be performed on command. At 563, the next de-duplication data structure may be opened. As discussed above, the de-duplication data structure may be one or more B+ trees. For example, a B+ tree may be created for each hash head or fingerprint and each B+ tree may be saved in its own file. At 565, a determination may be made as to whether an entry in the de-duplication data structure is invalid. At 567, a determination may be made as to whether an entry in the de-duplication data structure is duplicated. At 569, a determination may be made as to whether an entry in the de-duplication data structure is older than a predetermined age. The above determinations may be made in order to remove invalid, duplicated or aged dictionary entries in the de-duplication data structure.

After determining that a dictionary entry in the de-duplication data structure is either invalid, duplicated or aged, at 571, the de-duplication data structure may be locked. By locking the de-duplication data structure, the de-duplication maintainer may ensure that the de-duplication data structure is not modified, for example by the de-duplication tracker, during the time that the de-duplication maintainer deletes and rebalances the de-duplication data structure. At 573, the invalid, duplicated or aged dictionary entry may be deleted from the de-duplication data structure. In addition, at 575, the de-duplication data structure may be rebalanced, if necessary. For example, when the de-duplication data structure is a B+ tree, the de-duplication data structure may need to be rebalance due to deletion of some of the leaf nodes. After deleting the dictionary entry and rebalancing the de-duplication data structure, the de-duplication data structure may be unlocked. At 579, a determination may be made as to whether additional dictionary entries exist, and if so, the routine may proceed to determine whether the dictionary entries are invalid, duplicated or aged. At 581, a determination may be made as to whether additional de-duplication data structures exist, and if so, the routine may proceed to 563 and open the next de-duplication data structure.

Figure 6:
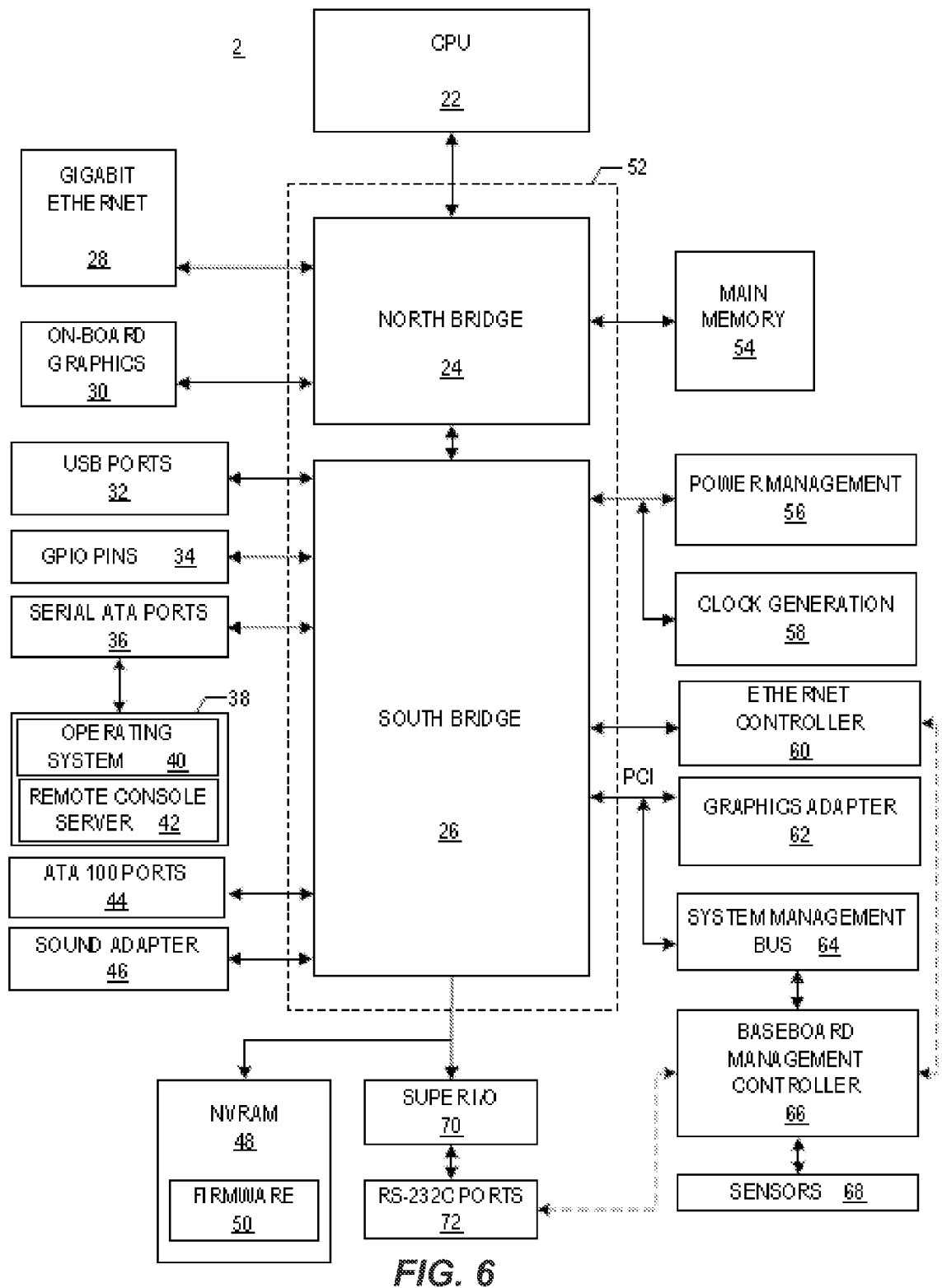
FIG. 6 is a computer architecture diagram illustrating a computer hardware architecture for a computing system capable of eliminating duplicate regions within a data storage system according to an embodiment presented herein.

FIG. 6 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, micro-processor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 6 shows an illustrative computer architecture for a storage server computer 2 that may be utilized in the implementations described herein. Such an illustrative computer system may also describe a client computer system 8A-8N. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory (RAM) used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus (USB) ports 32, a sound adapter 46, an Ethernet controller 60, and one or more general purpose input/output (GPIO) pins 34. The south bridge 26 may also provide a bus for interfacing peripheral card devices such as a graphics adapter 62. In one embodiment, the bus comprises a peripheral component interconnect (PCI) bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment (SATA) adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 6, may include other components that are not explicitly shown in FIG. 6, or may utilize an architecture completely different than that shown in FIG. 6.

Based on the foregoing, it should be appreciated that technologies for eliminating duplicated data within a data storage system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for identifying candidates for de-duplication in a data storage system, comprising:

maintaining at least one de-duplication data structure, the de-duplication data structure including a plurality of entries of B+ trees, each B+ tree corresponding to a unit of data and each root node of each B+ tree comprising a unique fingerprint of a signature of the unit of data;

coordinating with a kernel module to identify a unit of data for de-duplication;

calculating a signature of the identified unit of data;

searching the de-duplication data structure to determine whether the signature of the identified unit of data matches the signature of at least one of the entries in the de-duplication data structure;

upon determining that the signature of the identified unit of data matches the signature of at least one of the entries in the de-duplication data structure, queuing the identified unit of data for de-duplication in a de-duplication queue;

upon determining that the signature of the identified unit of data does not match the signature of at least one of the entries in the de-duplication data structure, adding a new entry to the de-duplication data structure corresponding to the identified unit of data;

reviewing the entries of the de-duplication data structure and removing obsolete entries from the de-duplication data structure; and coordinating with the kernel module to perform de-duplication operations on the de-duplication queue.

2. The method of claim 1, wherein the units of data are 64 KB chunks of data.

3. The method of claim 1, wherein coordinating with a kernel module comprises identifying a unit of data for de-duplication concurrently with I/O operations.

4. The method of claim 1, wherein coordinating with a kernel module comprises identifying a unit of data for de-duplication based on one of: Information Lifecycle Management (ILM) information, First Write Bitmap (FWB) information and information regarding whether the unit of data changed during a previous de-duplication period.

5. The method of claim 1, wherein each entry in the de-duplication data structure further comprise a timestamp indicating a time of calculation of the signature of the unit of data, and removing obsolete entries further comprises removing at least one of: an entry corresponding to a unit of data that changed during a previous de-duplication period, an entry having a timestamp older than a predetermined time and an entry corresponding to a unit of data associated with multiple entries in the de-duplication data structure.

6. A non-transitory computer-readable storage medium having computer-executable instructions stored thereon that, when executed by a storage system computer, cause the storage system computer to:

maintain at least one de-duplication data structure, the de-duplication data structure including a plurality of entries of B+ trees, each B+ tree corresponding to a unit of data and each root node of each B+ tree comprising a unique fingerprint of a signature of the unit of data and a timestamp;

coordinate with a kernel module to identify a unit of data for de-duplication;

calculate a signature of the identified unit of data;

search the de-duplication data structure to determine whether the signature of the identified unit of data matches the signature of at least one of the entries in the de-duplication data structure;

upon determining that the signature of the identified unit of data matches the signature of at least one of the entries in the de-duplication data structure, queue the identified unit of data for de-duplication in a de-duplication queue;

upon determining that the signature of the identified unit of data does not match the signature of at least one of the entries in the de-duplication data structure, add a new entry to the de-duplication data structure corresponding to the identified unit of data;

review the entries of the de-duplication data structure and remove obsolete entries from the de-duplication data structure; and coordinate with the kernel module to perform de-duplication operations on the de-duplication queue.

7. The non-transitory computer-readable storage medium of claim 6, having further computer-executable instructions stored thereon that, when executed by the storage system computer, cause the storage system computer to coordinate with a kernel module by identifying a unit of data for de-duplication concurrently with I/O operations.

8. The non-transitory computer-readable storage medium of claim 6, having further computer-executable instructions stored thereon that, when executed by the storage system computer, cause the storage system computer to coordinate with a kernel module by identifying a unit of data for de-duplication based on one of: Information Lifecycle Management (ILM) information, First Write Bitmap (FWB) information and information regarding whether the unit of data changed during a previous de-duplication period.

9. The non-transitory computer-readable storage medium of claim 6, having further computer-executable instructions stored thereon that, when executed by the storage system computer, cause the storage system computer to predict a period of low load on the storage system computer using Information Lifecycle Management (ILM) information and coordinate with the kernel module to perform de-duplication operations on the de-duplication queue during the period of low load.

10. The non-transitory computer-readable storage medium of claim 6, having further computer-executable instructions stored thereon that, when executed by the storage system computer, cause the storage system computer to coordinate with the kernel module to perform de-duplication operations on the de-duplication queue based on a predetermined schedule.

11. A data storage system, comprising:
a processing unit;
a memory in communication with the processing unit; and
a de-duplication lister module configured to:
coordinate with a kernel module to identify a unit of data for de-duplication; and
calculate a signature of the identified unit of data;
a de-duplication queue module configured to manage a de-duplication queue including units of data marked for de-duplication;
a de-duplication tracker module configured to:
maintain at least one de-duplication data structure, the de-duplication data structure including a plurality of entries of B+ trees, each B+ tree corresponding to a unit of data and each root node of each B+ tree comprising a unique fingerprint of a signature of the unit of data and a timestamp;
search the de-duplication data structure to determine whether the signature of the identified unit of data matches the signature of at least one of the entries in the de-duplication data structure;
upon determining that the signature of the identified unit of data matches the signature of at least one of the entries in the de-duplication data structure, mark the identified unit of data for de-duplication and communicate the marked unit of data to the de-duplication queue module;
upon determining that the signature of the identified unit of data does not match the signature of at least one of the entries in the de-duplication data structure, add a new entry to the de-duplication data structure corresponding to the identified unit of data;
a de-duplication maintainer module configured to review the entries of the de-duplication data structure and remove obsolete entries from the de-duplication data structure; and
a de-duplication engine module configured to coordinate with the kernel module to perform de-duplication operations on the de-duplication queue.

12. The data storage system of claim 11, wherein the de-duplication lister module is further configured to coordinate with a kernel module by identifying a unit of data for de-duplication concurrently with I/O operations.

13. The data storage system of claim 11, wherein the de-duplication lister module is further configured to coordinate with a kernel module by identifying a unit of data for de-duplication based on one of: Information Lifecycle Management (ILM) information, First Write Bitmap (FWB) information and information regarding whether the unit of data changed during a previous de-duplication period.

14. The data storage system of claim 11, wherein the de-duplication maintainer module is further configured to review the entries of the de-duplication data structure by traversing the B+ tree.

15. The data storage system of claim 14, wherein the obsolete entries in the de-duplication data structure are at least one of: an invalid entry, a duplicative entry or an aged entry in the B+ tree.

* * * * *